(12) United States Patent
Hahn et al.

(10) Patent No.: US 11,056,138 B2
(45) Date of Patent: Jul. 6, 2021

(54) DISK DRIVE SUSPENSION TRI-STAGE ACTUATOR WITH SINGLE SIDE ACTUATOR ATTACH

(71) Applicant: Magnecomp Corporation, Murrieta, CA (US)

(72) Inventors: Peter Hahn, Bangkok (TH); David Glaess, Bangkok (TH); Kuen Chee Ee, Chino, CA (US)

(73) Assignee: Magnecomp Corporation, Murrieta, CA (US)

( * ) Notice: Subject to any disclaimer, the term of this patent is extended or adjusted under 35 U.S.C. 154(b) by 0 days.

(21) Appl. No.: 16/352,624

(22) Filed: Mar. 13, 2019

(65) Prior Publication Data

US 2019/0295574 A1 Sep. 26, 2019

Related U.S. Application Data

(60) Provisional application No. 62/645,705, filed on Mar. 20, 2018.

(51) Int. Cl.
*G11B 5/596* (2006.01)
*G11B 5/48* (2006.01)
*G11B 5/55* (2006.01)

(52) U.S. Cl.
CPC ............ *G11B 5/483* (2015.09); *G11B 5/4806* (2013.01); *G11B 5/4826* (2013.01); *G11B 5/5552* (2013.01); *G11B 5/596* (2013.01)

(58) Field of Classification Search
None
See application file for complete search history.

(56) References Cited

U.S. PATENT DOCUMENTS

| | | | |
|---|---|---|---|
| 7,218,481 B1 | 5/2007 | Bennin et al. | |
| 8,144,435 B2 | 3/2012 | Greminger et al. | |
| 8,559,138 B1* | 10/2013 | Hahn et al. | G11B 5/4873 360/294.4 |
| 8,681,456 B1 | 3/2014 | Miller et al. | |
| 8,730,621 B2 | 5/2014 | Brandts et al. | |
| 8,885,299 B1 | 11/2014 | Bennin et al. | |
| 9,390,738 B1* | 7/2016 | Mendonsa et al. | G11B 5/483 |
| 2014/0139953 A1* | 5/2014 | Hatch | G11B 5/483 360/234.5 |
| 2018/0005653 A1* | 1/2018 | Pokornowski et al. | G11B 5/483 |
| 2018/0040343 A1* | 2/2018 | Ee et al. | G11B 5/483 |
| 2019/0136940 A1* | 5/2019 | Ee | G11B 5/4873 |
| 2019/0221231 A1* | 7/2019 | Hahn et al. | G11B 5/483 |

* cited by examiner

*Primary Examiner* — Craig A. Renner
(74) *Attorney, Agent, or Firm* — DLA Piper LLP (US)

(57) ABSTRACT

A tri-stage actuated disk drive suspension is described. The tri-stage actuated disk drive suspension including a beam and a gimbal attached to the beam. The gimbal is configured to receive a first actuator to mount on a first surface of the suspension near a first lateral side of the suspension and is configured to receive a second actuator to mount on the first surface of the gimbal near a second lateral side of the suspension. The gimbal is configured to receive a head slider to mount on the first surface of the suspension. And, the tri-stage actuated disk drive suspension including a baseplate having the beam attached thereto. The baseplate configured to receive a third actuator from the first surface of the suspension to mount on a pair of shelves.

22 Claims, 4 Drawing Sheets

DISK DRIVE SUSPENSION TRI-STAGE ACTUATOR WITH SINGLE SIDE ACTUATOR ATTACH

CROSS-REFERENCE TO RELATED APPLICATIONS

This application claims priority from U.S. Provisional Patent Application No. 62/645,705, filed on Mar. 20, 2018, which is hereby incorporated by reference in its entirety.

FIELD

This invention relates to the field of suspensions for disk drives. More particularly, this invention relates to the field of a disk drive suspension having tri-stage actuation.

BACKGROUND

Magnetic hard disk drives and other types of spinning media drives such as optical disk drives are well known. A typical hard disk drive includes a spinning magnetic disk containing a pattern of magnetic ones and zeroes on it that constitutes the data stored on the disk drive. The magnetic disk is driven by a drive motor. The disk drive further includes a disk drive suspension to which a magnetic head slider is mounted proximate a distal end of a load beam. The head slider contains magnetic read transducers and magnetic write transducers to respectively read data from, and write data to, the magnetic disk. The "proximal" end of a suspension or a load beam is the end that is supported, i.e., the end nearest to an actuator arm to which the suspension is attached. The "distal" end of a suspension or load beam is the end that is opposite the proximal end, i.e., the "distal" end is the cantilevered end.

The suspension is typically coupled to an actuator arm, which in turn is coupled to a voice coil motor that moves the suspension arcuately in order to position the head slider over the correct data track on the spinning data disk. The head slider is carried on a gimbal which allows the slider to pitch and roll so that it follows the proper data track on the disk, allowing for such variations as vibrations of the disk, inertial events such as bumping, and irregularities in the disk's surface.

Both single stage actuated disk drive suspensions and dual stage actuated (DSA) suspension are known. In a single stage actuated suspension, only the voice coil motor moves the suspension.

In a DSA suspension, in addition to the voice coil motor which moves the entire suspension, at least one microactuator is located on the suspension in order to effect fine movements of the magnetic head slider to keep it properly aligned over the data track on the spinning disk. The microactuator(s) provide much finer control and much higher bandwidth of the servo control loop than does the voice coil motor alone, which effects relatively coarse movements of the suspension and hence the magnetic head slider. A piezoelectric element, sometimes referred to simply as a PZT, is often used as the microactuator motor, although other types of microactuator motors are possible. In the discussion that follows, for simplicity the microactuator will be referred to simply as a "PZT," although it will be understood that the microactuator need not be of the PZT type.

DSA designs in which the PZT microactuators are located on or at the gimbal have also been proposed. Such designs are generally referred to as "GDA" designs. DSA suspensions having a single microactuator on one lateral side of a suspension and a pseudo feature on the other lateral side in order to counterbalance the single microactuator have also been proposed.

SUMMARY

A tri-stage actuated disk drive suspension is described. The tri-stage actuated disk drive suspension including a beam and a gimbal attached to the beam. The gimbal is configured to receive a first actuator to mount on a first surface of the suspension near a first lateral side of the suspension and is configured to receive a second actuator to mount on the first surface of the gimbal near a second lateral side of the suspension. The gimbal is configured to receive a head slider to mount on the first surface of the suspension. And, the tri-stage actuated disk drive suspension including a baseplate having the beam attached thereto. The baseplate configured to receive a third actuator from the first surface of the suspension to mount on a pair of shelves.

Other features and advantages of embodiments will be apparent from the accompanying drawings and from the detailed description that follows.

BRIEF DESCRIPTION OF THE DRAWINGS

Embodiments are illustrated by way of example and not limitation in the figures of the accompanying drawings, in which like references indicate similar elements and in which.

DETAILED DESCRIPTION

Figure 1:
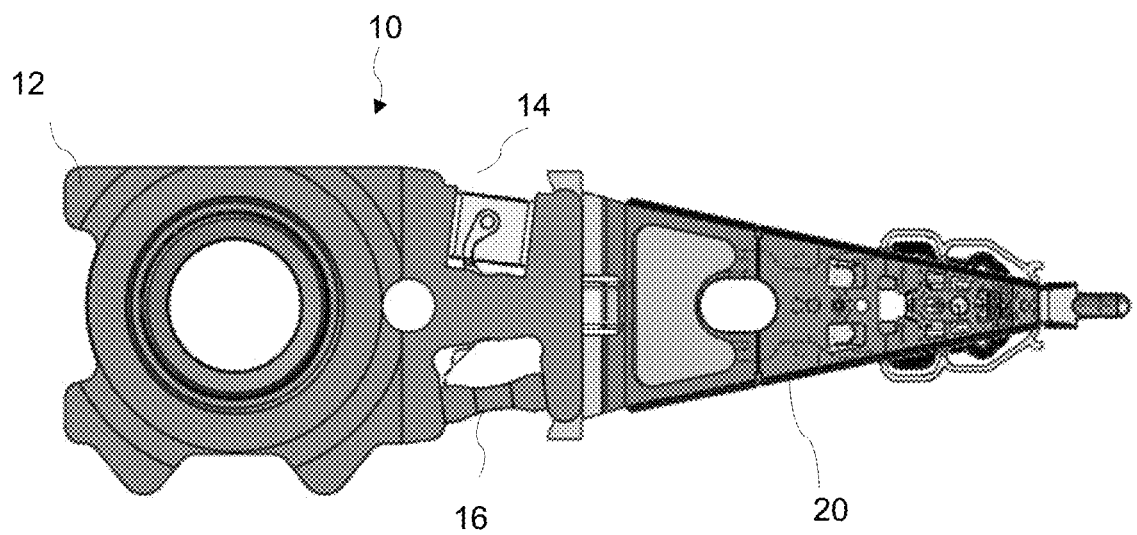
FIG. 1 illustrates a top oblique view of tri-stage actuated suspension having a single actuator at the baseplate and a pseudo feature according to an embodiment.

FIG. 1 illustrates a top oblique view of tri-stage actuated suspension 10 having a single actuator 14 at the baseplate 12 and a pseudo feature 16 according to an embodiment. Expansion and contraction of the actuator 14 moves load beam or beam 20 of suspension 10 using techniques including those known in the art. Pseudo feature 16 balances out the mass, mass distribution, and stiffness of actuator 14. Pseudo feature 16 could be manufactured separately and then affixed to baseplate 12 such as by laser welding or by adhesive. Pseudo feature 16 could also be partly or wholly manufactured integrally with baseplate 12. Because baseplate 12 is typically made from stainless steel (SST), pseudo feature 16 could be unitarily formed with baseplate 12 from a single piece of stainless steel. Etching or laser ablation could create areas of greater and lesser thickness and width within pseudo-structure 16. Furthermore, laser treatment could locally alter the mechanical properties of the stainless steel within pseudo feature 16, such as creating locally softer areas, to help fine tune the properties of pseudo feature 16.

Figure 2:
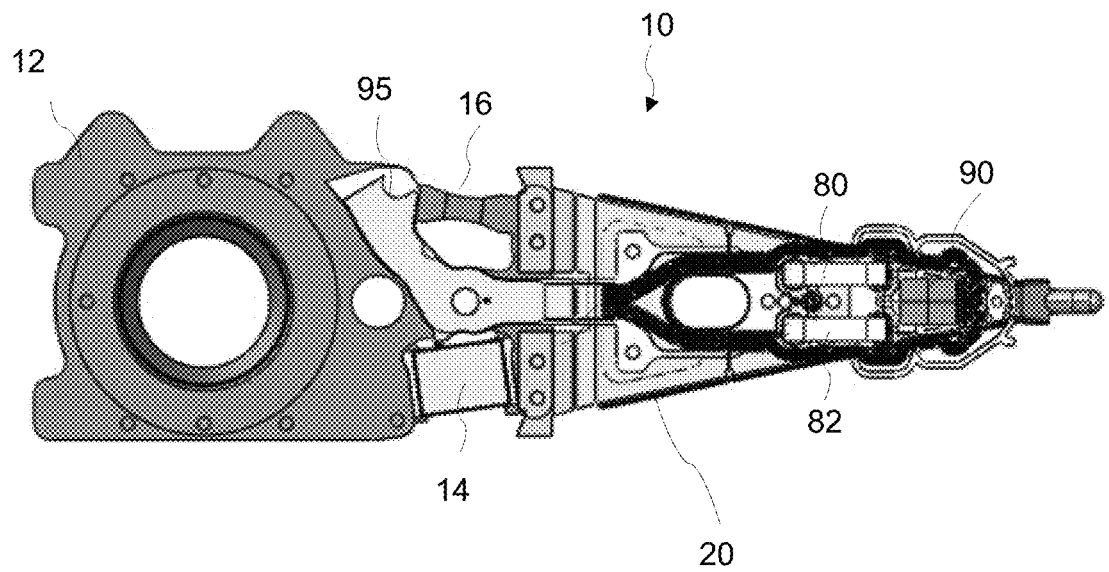
FIG. 2 illustrates a bottom oblique view of the suspension of FIG. 1.

FIG. 2 illustrates a bottom oblique view of the suspension 10 of FIG. 1. Two actuators 80/82 on opposite lateral sides of the suspension act in push-pull fashion on the gimbal to rotate head slider 90 using techniques including those known in the art. Head slider 90 contains a magnetic read transducer and a magnetic write transducer in order to respectively read data from, and write data to, the disk drive platter. Only part of the conductive layer 95 including electrical circuit traces are shown; in reality, the electrical circuit traces would normally extend from head slider 90 to beyond baseplate 12, i.e., to the upper left of baseplate 12 in the figure, defining a tail region of the circuit.

Figure 3:
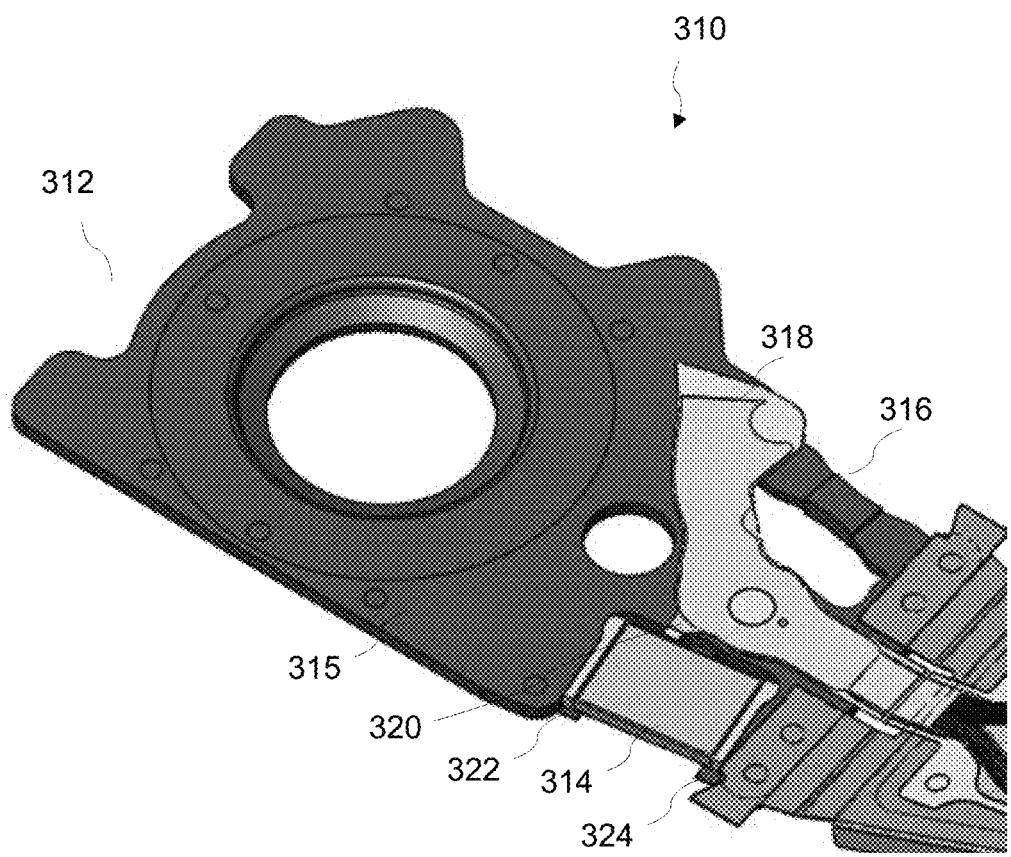
FIG. 3 illustrates a bottom oblique view of a tri-stage actuated suspension having a single actuator at the baseplate and a pseudo feature according to an embodiment.

FIG. 3 illustrates a bottom oblique view of a tri-stage actuated suspension 310 having a single actuator 314 at the baseplate 312 and a pseudo feature 316 according to an embodiment. The baseplate is configured to receive an actuator 314 from a first surface, such as the bottom side 315 of the suspension 310, which is the same side that a head slider is mounted to the suspension. The suspension 310 also includes a conductive layer 318 that includes electrical circuit traces configured to connect to one or more electrical components including, but not limited to, one or more actuators, a head slider, and other electrical components on the suspension. For various embodiments, the conductive layer 318 includes a jog forming 320. The jog forming is configured to electrically couple an electrode of the actuator 314 at the baseplate 312 to one or more electrical circuit traces. The electrical circuit traces, for various embodiments, provide a drive signal to the actuator 314 at the baseplate 312. The jog forming 320 is configured to electrically couple an electrode of the actuator 314 at the baseplate 312 near the top surface 330 of the baseplate 312 to the conductive layer 318 on the bottom sided 315 of the baseplate 312. The jog forming 320 includes a pad section 333 configured to attached to an electrode of the actuator 314 at the baseplate 312. The pad section 333 is attached to an electrode of the actuator 312 using conductive adhesive, solder, or other techniques known in the art to attach an electrical contact to an electrode of an actuator.

The baseplate 312 also includes a first shelf 322 and a second shelf 324 to attach the actuator 314. For various embodiments, the first shelf 322 and the second shelf 324 can be formed integrally with the baseplate 312. For other embodiments, the first shelf 322 and the second shelf 324 are separate from baseplate 312 and attached to the baseplate 312 using techniques including adhesive, welding, and other attachment techniques including those known in the art.

Figure 4:
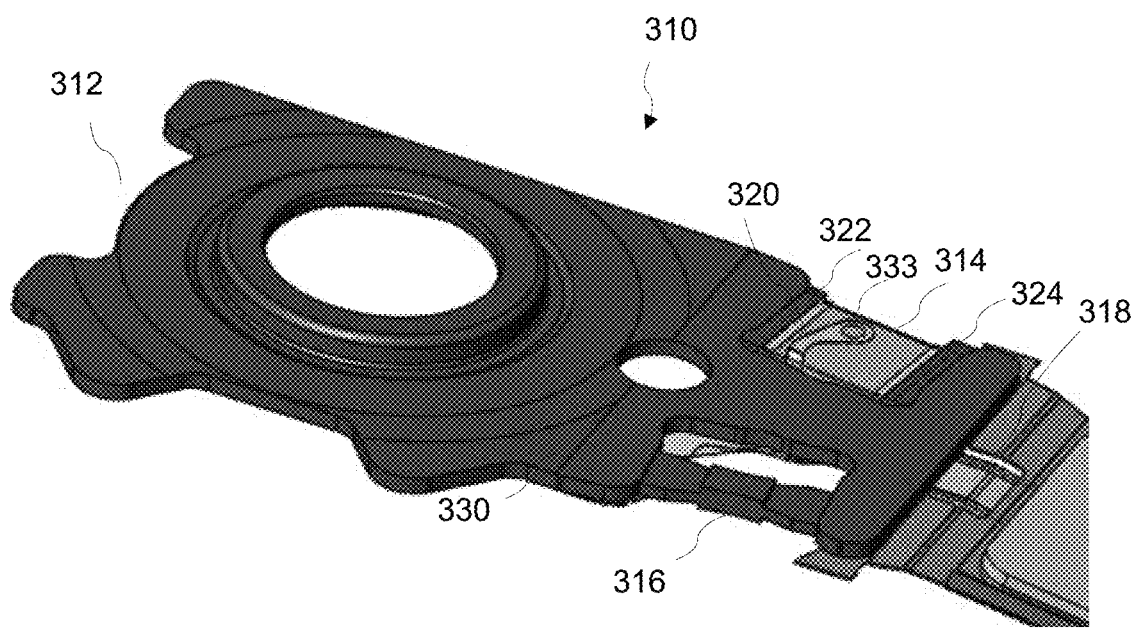
FIG. 4 is a top oblique view of the tri-stage actuated suspension 310 illustrated in FIG. 3.

FIG. 4 is a top oblique view of the tri-stage actuated suspension 310 illustrated in FIG. 3. The first shelf 322 and the second shelf 324 are arranged such that they are closer to the top surface 330 of the baseplate 312 according to some embodiments. For some embodiments, the surface of the first shelf 322 and the second shelf 324 opposite the surface configured to receive the actuator is flush with the top surface of the baseplate 312. For yet other embodiments, the surface of the first shelf 322 and the second shelf 324 opposite the surface configured to receive the actuator extend beyond the top surface 330 of the top surface 330 of the base plate 312. The shelves 322, 324 arrangement with respect to the top surface 330 of the baseplate 312 provides the actuator 314 to be mounted to the baseplate 312 from the bottom side of the suspension 310. For various embodiments of the suspension, the shelves 322, 324 are configured to mount an actuator 314 to the baseplate 312 from the bottom, which is the same for the two actuators mounted on the gimbal. Thus, the actuator 314 mounted on the baseplate 312 can be mounted at the same time as any actuators mounted on the gimbal. This can eliminate manufacturing steps to increase manufacturing efficiency while reducing manufacturing time and costs.

Figure 5:
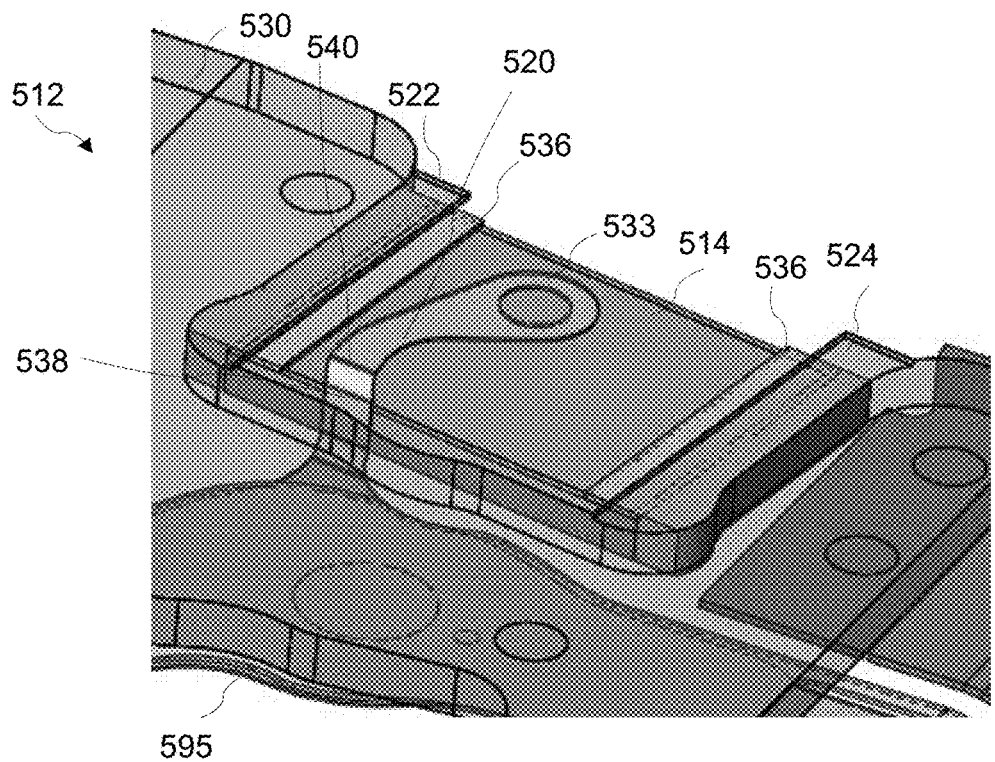
FIG. 5 illustrates top oblique view of a section of a baseplate of a tri-stage actuated suspension according to an embodiment.

FIG. 5 illustrates top oblique view of a section of a baseplate of a tri-stage actuated suspension according to an embodiment. The baseplate 512 includes a first shelf 522 and a second shelf 524, such as those described herein. The actuator 514 is mounted to the first shelf 522 and the second shelf 522 using techniques including those described herein. For various embodiments, the actuator 514 is mounted to the first shelf 522 and the second shelf 524 using non-conductive adhesive 536. The non-conductive adhesive 536 may be applied the first shelf 522 and the second shelf 524 from the bottom surface of the baseplate prior to mounting the actuator 514.

After the actuator 514 is mounted on the first shelf 522 and the second shelf 524, conductive adhesive can be added to electrically couple a second electrode of the actuator 514 with the baseplate 512 to ground the second electrode on the bottom side of baseplate using techniques including those known in the art. For various embodiments, the suspension includes a jog forming 520 configured to electrically couple a conductive layer 595 including electrical circuit traces on the bottom surface of the baseplate 512 to a first electrode of the actuator. The jog forming 520 includes a transition portion 538 configured to transverse a side of the baseplate 512 between the bottom surface and a top surface 530 of the baseplate 512. For some embodiments, the transition portion 538 includes one or more bends 540 in the jog forming 520 to electrically couple the conductive layer to the pad 533. The jog forming 520 is configured to be between the actuator 514 and the baseplate 512 according to some embodiments. A pad section 533 of the job forming 520 is configured to attach to the first electrode of the actuator 514. For various embodiments, the pad section 533 attached to an electrode of an actuator using techniques including those described herein. The jog forming 520 is configured to attach to the actuator 514 near a surface of the baseplate, such as the top surface 530, opposite from the surface that the actuator is mounted from, which enables the actuator 514 to be attached to the baseplate 512 from the bottom surface of the baseplate 512.

Figure 6:
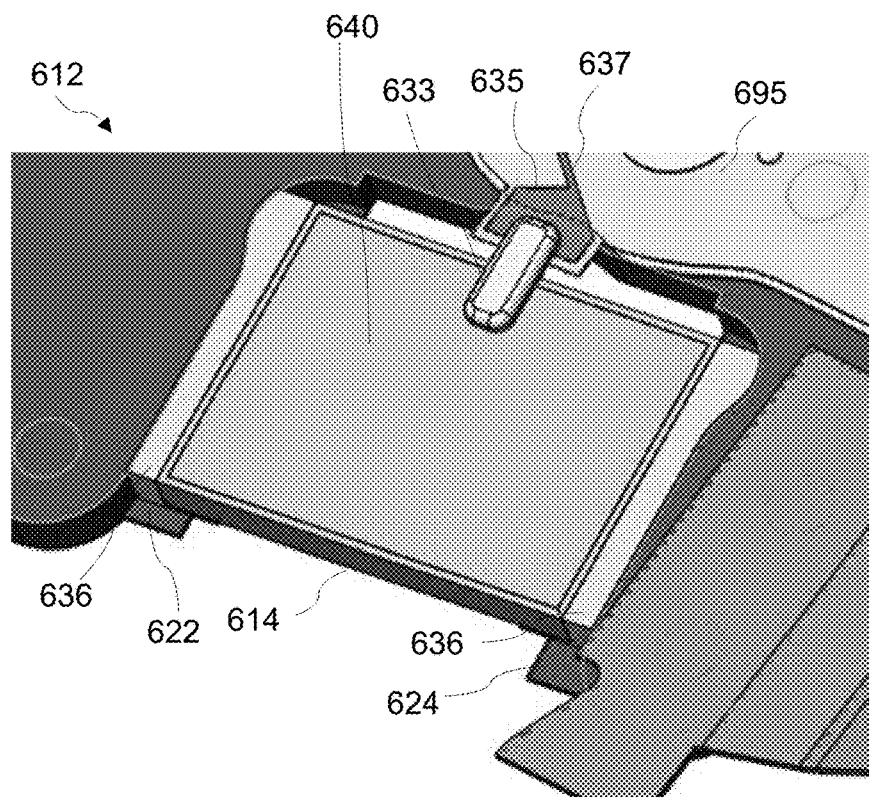
FIG. 6 illustrates top oblique view of a section of a baseplate of a tri-stage actuated suspension according to an embodiment.

FIG. 6 illustrates top oblique view of a section of a baseplate of a tri-stage actuated suspension according to an embodiment. The baseplate 612 includes a first shelf 622 and a second shelf 624, such as those described herein. The actuator 614 is mounted to the first shelf 622 and the second shelf 624 using techniques including those described herein. For various embodiments, the actuator is mounted to the first shelf 622 and the second shelf 624 using conductive adhesive 636. The conductive adhesive 636 attaches the actuator 614 to the baseplate 612 and electrically couples a first electrode having contacts on each side of the actuator 614 with the baseplate 612 to ground the first electrode. The conductive adhesive 636 may be applied the first shelf 622 and the second shelf 624 from the bottom surface of the baseplate prior to mounting the actuator 614 using techniques including those known in the art.

For various embodiments, the actuator 614 is electrically coupled with a conductive layer 695 including electrical circuit traces using a conductive adhesive connector 633. The conductive adhesive connector 633 is configured to attach to a pad 635 of the conductive layer 695. The pad 635 may be formed of copper or other conductive material. The pad 635 is coupled with at least one electrical circuit trace 637. The electrical circuit trace 637 is configured to provide a drive signal to the second electrode 640 of the actuator 614 using techniques including those known in the art. For some embodiments, a high viscosity electrically conductive adhesive is used to electrically couple the second electrode 640 to the pad 635 to ensure that the conductive adhesive 635 does not drip in to a gap between the baseplate 612 and the actuator 614.

Figure 7:
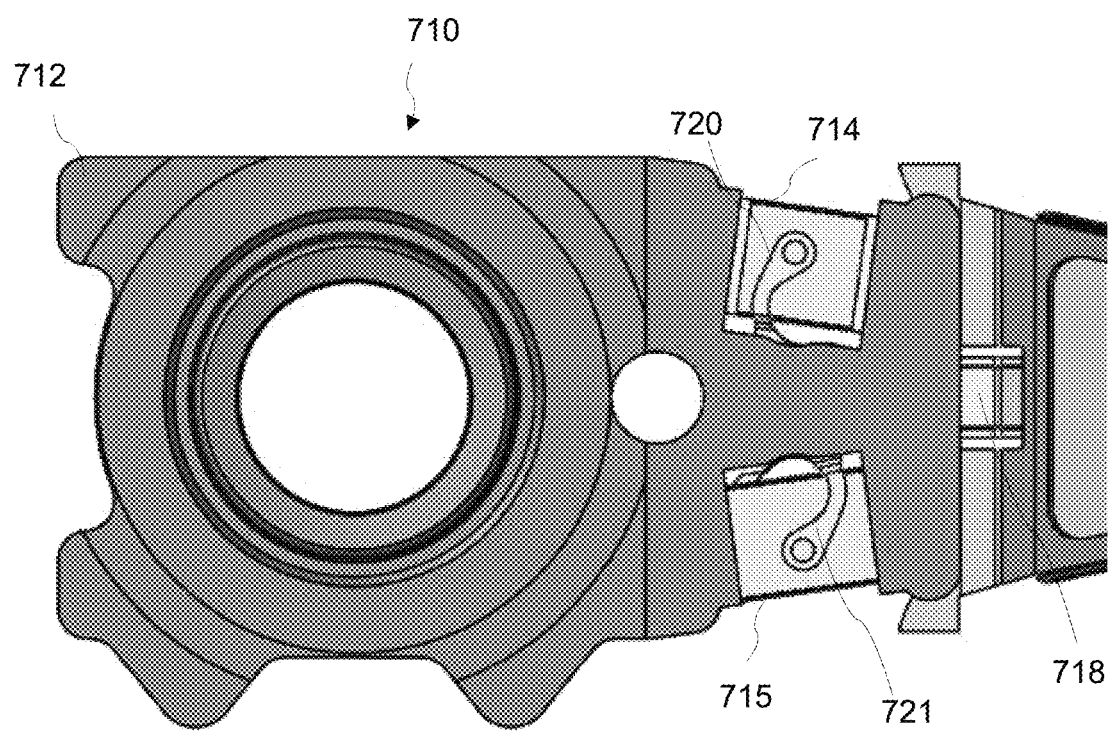
FIG. 7 illustrates a top oblique view of the tri-stage actuated suspension including two actuators at the baseplate according to an embodiment.

FIG. 7 is a top oblique view of the tri-stage actuated suspension including two actuators at the baseplate according to an embodiment. The suspension 710 includes a first actuator 714 at the baseplate and a second actuator 715 at the baseplate. Each of the first actuator 714 at the baseplate and the second actuator 715 at the baseplate are mounted to a first shelf and a second shelf similar those described herein. The first actuator 714 and the second actuator 715 are attached to the shelves using techniques including those described herein. For various embodiments of the suspension, the shelves are configured to mount the first actuator 714 and the second actuator 715 to the baseplate 712 from the bottom, which is the same side of the suspension 710 that the actuators mounted on the gimbal of the suspension 710 are mounted to the suspension 710. Thus, all the actuators of the suspension can be mounted from the same side of the suspension 710. This can eliminate manufacturing steps to increase manufacturing efficiency while reducing manufacturing time and costs.

The suspension 710 also includes a conductive layer 718 that includes electrical circuit traces configured to connect to one or more electrical components including, but not limited to, one or more actuators, a head slider, and other electrical components on the suspension 710. For various embodiments, the conductive layer 718 is electrically coupled with the first actuator 714 and the second actuator 715 using techniques including those described herein. For some embodiments, the first actuator 714 is electrically coupled with one or more electrical circuit traces of a conductive layer through a first jog forming 720. A second jog forming 721 is configured to electrically couple an electrode of the second actuator 715 at the baseplate 712 to one or more electrical circuit traces of the conductive layer 718. The electrical circuit traces, for various embodiments, are configured to provide drive signal to each of the first actuator 714 and the second actuator 715 at the baseplate 712 using techniques including those known in the art.

Although the present invention has thus been described in detail with regard to the preferred embodiments and drawings thereof, it should be apparent to those skilled in the art that various adaptations and modifications of the present invention may be accomplished without departing from the spirit and the scope of the invention. Accordingly, it is to be understood that the detailed description and the accompanying drawings as set forth hereinabove are not intended to limit the breadth of the present invention, which should be inferred only from the following claims and their appropriately construed legal equivalents.

What is claimed is:

1. A tri-stage actuated disk drive suspension comprising:
   a beam;
   a gimbal attached to the beam extending in a first direction, the gimbal including a first location near a first lateral side of the suspension configured to receive a first actuator to be mounted on a first surface of the suspension, a second location near a second lateral side of the suspension configured to receive a second actuator to be mounted on the first surface, the gimbal configured to receive a head slider to be mounted on the first surface of the suspension; and
   a baseplate attached to the beam extending in a second direction opposite the first direction, the baseplate includes a first pair of shelves near the first lateral side of the suspension configured to receive a third actuator in a direction towards the first surface.

2. The tri-stage actuated disk drive suspension of claim 1, wherein the baseplate includes a pseudo feature.

3. The tri-stage actuated disk drive suspension of claim 1, further comprising a conductive layer including a jog forming.

4. The tri-stage actuated disk drive suspension of claim 3 wherein the jog forming is configured to electrically couple to an electrode of the third actuator on an opposite side of the suspension from the first surface.

5. The tri-stage actuated disk drive suspension of claim 4, wherein the jog forming includes one or more bends.

6. The tri-stage actuated disk drive suspension of claim 3, wherein the jog forming includes a pad configured to attach to an electrode of the third actuator.

7. The tri-stage actuated disk drive suspension of claim 5, wherein the jog forming includes one or more bends and is configured to be between the third actuator and the baseplate.

8. The tri-stage actuated disk drive suspension of claim 1, wherein the first pair of shelves are formed integrally with the baseplate.

9. The tri-stage actuated disk drive suspension of claim 1, wherein a second surface of each shelf of the first pair of shelves is flush with a second surface of the suspension.

10. The tri-stage actuated disk drive suspension of claim 1, further comprising a conductive layer electrically coupled to the third actuator using a conductive adhesive connector.

11. The tri-stage actuated disk drive suspension of claim 10, wherein the conductive adhesive connector is electrically coupled to a third electrode at the first surface of the suspension.

12. The tri-stage actuated disk drive suspension of claim 10, wherein the conductive adhesive connector is a high viscosity electrically conductive adhesive.

13. The tri-stage actuated disk drive suspension of claim 1, wherein the baseplate includes a second pair of shelves configured to receive a fourth actuator in a direction towards the first surface.

14. A suspension comprising:
   a beam;
   a gimbal attached to the beam, the gimbal including a first actuator mounted on a first surface of the suspension and a second actuator mounted on the first surface, the gimbal including a head slider mounted on the first surface; and
   a baseplate attached to the beam, the baseplate including a third actuator mounted on a first pair of shelves in a direction towards the first surface of the suspension.

15. The suspension of claim 14, wherein the baseplate includes a pseudo feature.

16. The suspension of claim 14, further comprising a conductive layer including a jog forming.

17. The suspension of claim 16, wherein the jog forming is configured to electrically couple to an electrode of the third actuator on an opposite side of the suspension from the first surface.

18. The suspension of claim 17, wherein the jog forming includes one or more bends.

19. The suspension of claim 16, wherein the jog forming includes a pad configured to attach to an electrode of the third actuator.

20. The suspension of claim 14, wherein the pair of shelves are formed integrally with the baseplate.

21. The suspension of claim 14, wherein a second surface of each shelf of the pair of shelves is flush with a second surface of the suspension.

22. The suspension of claim 14, further comprising a conductive layer electrically coupled to the third actuator using a conductive adhesive connector.

\* \* \* \* \*